United States Patent [19]

Buckelew

[11] 4,256,366
[45] Mar. 17, 1981

[54] AIRCRAFT VISUAL COLLISION AND AVOIDANCE DEVICE

[76] Inventor: Arthur L. Buckelew, 977 Jeannette Ave., Thousand Oaks, Calif. 91360

[21] Appl. No.: 28,267

[22] Filed: Apr. 9, 1979

[51] Int. Cl.³ ............................................. G02B 5/12
[52] U.S. Cl. ...................................... 350/97; 340/25; 340/74
[58] Field of Search ................. 350/97, 98, 99, 100, 350/102, 103, 104, 105, 106; 301/37; 340/25, 74; 325/16; 244/114; 40/125

[56] References Cited

U.S. PATENT DOCUMENTS

| | | | |
|---|---|---|---|
| 2,991,698 | 7/1961 | Leubay | 350/105 |
| 3,277,800 | 10/1966 | Wiswell | 350/97 |
| 3,399,607 | 9/1968 | Eigenmann | 350/97 |
| 3,867,013 | 2/1975 | Ashenfarb | 350/97 |
| 3,903,501 | 9/1975 | Greenlee et al. | 340/25 |
| 3,905,680 | 9/1975 | Nagel | 350/97 |
| 3,975,083 | 8/1976 | Rowland | 350/104 |
| 3,980,393 | 9/1976 | Heasley et al. | 350/97 |
| 4,025,158 | 5/1977 | Tsuyama | 350/97 |
| 4,070,095 | 1/1978 | Suhr | 350/97 |
| 4,145,111 | 3/1979 | Hansson et al. | 350/97 |

Primary Examiner—John K. Corbin
Assistant Examiner—B. W. de los Reyes
Attorney, Agent, or Firm—Dennis L. Mangrum

[57] ABSTRACT

The present invention relates to a device for use on airplanes to permit visual identification and location by pilots of other aircraft in the vicinity so as to avoid mid-air collision. The device refracts and reflects light so as to make the plane visually observable by pilots, any other aircraft in the area. The device is formed as a tape and attached to various parts of an aircraft. Refracting elements redirect light towards reflecting elements for intensifying and directing it therefrom, creating a readily recognizable shimmering image.

11 Claims, 5 Drawing Figures

U.S. Patent    Mar. 17, 1981    4,256,366
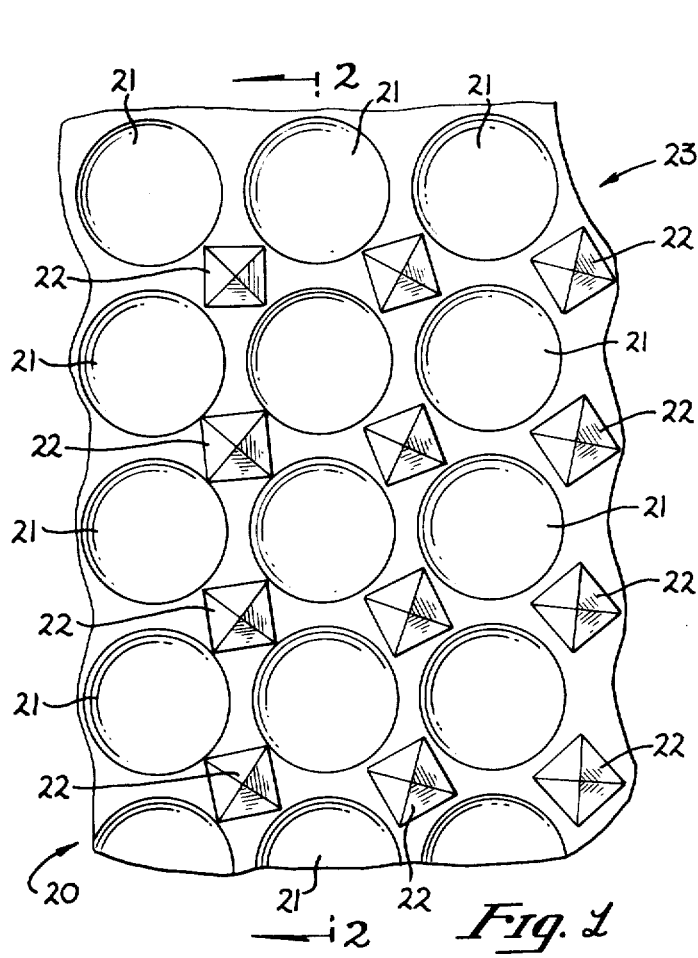
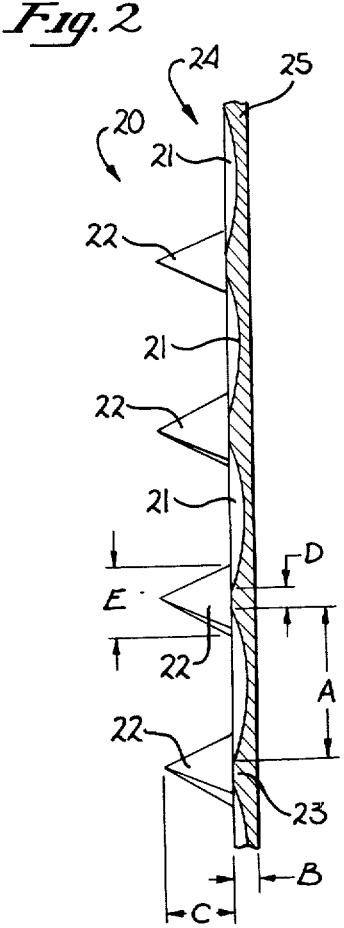
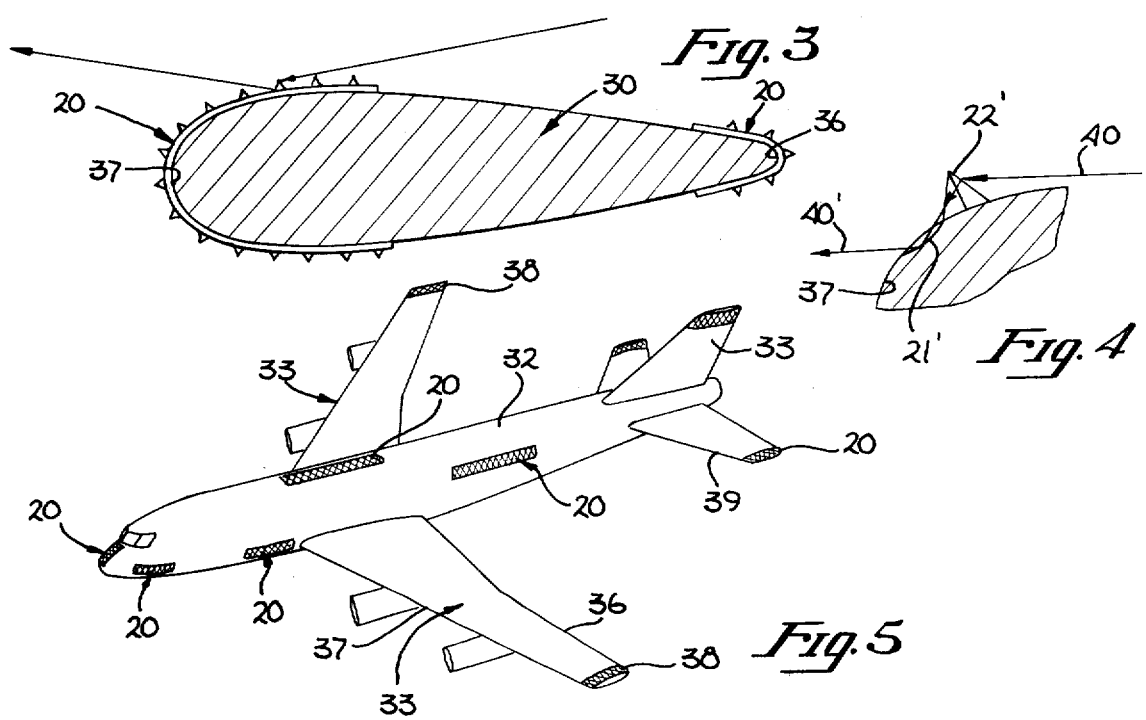

AIRCRAFT VISUAL COLLISION AND AVOIDANCE DEVICE

BACKGROUND OF THE INVENTION

1. Field of the Invention

The present invention relates to a device attached to aircraft capable of reflecting and refracting light so as to make the airplane visually observable for collision avoidance.

2. Prior Art

The by-word in aviation for avoidance of mid-air collisions has always been to "see and be seen." That philosophy is becoming more and more important today because of the great increase in the number of aircraft being flown and the cosmetic-changes from early aviation. In the early days of aviation, the mid-air collision was not a concern or problem. Today, however, the mid-air collision is a real problem and a serious concern of all pilots. Mid-air collisions have happened and will continue to occur until aircraft are able to more readily be seen.

Mid-air collisions are of particular concern at the conjested points of air travel, namely airports. Several factors exist, which have created the great increase in mid-air collisions. First, airports are becoming conjested, causing stacking or delay in landing. Second, aircraft land and take-off at high speeds. Third, aircraft are bigger, and consequently slower, to respond to evasive action. Last, aircraft cosmetics tend to camouflage, rather than make the aircraft easily identifiable.

Commercial aircraft approaching high density airports, as well as all airports, normally operate around 275 miles per hour, and may attain speed of between 90-150 miles per hour on take-off. Those high speeds create a very rapid closing rate between two converging aircraft, and shortens pilot reaction time for evasive action. The general rule of thumb is that an aircraft on a collision course must be seen before it gets closer than two miles to permit avoidance corrective action to be taken. If the aircraft is first observed at a distance of one mile, extreme evasion may prevent collision. If initial observation is closer than one mile, evasive action cannot avoid collision.

It is true today that several steps have been taken to help prevent mid-air collision, among them being regulations adopted by the Federal Aviation Agency (FAA) and improved radar facilities. Specifically, FAA Regulations attempt to provide certain corridors for incoming and outgoing aircraft, as well as to provide corridors for aircraft traveling in certain directions and/or holding patterns. On the other hand, radar has been improved as a warning device. Radar, both on board aircraft and inground, support facilities that serve to warn pilots that other aircraft are in the area, or on a collision course. However, FAA rules and radar devices only help in warning of an impending mid-air collision. The actual avoidance of mid-air collisions is the sole duty and responsibility of the pilots. In order for the pilots to take corrective action and to avoid mid-air collisions, they must "see and be seen." The warning devices such as radar, simply alert the pilot of an impending problem, the pilot must then locate the impending problem and take the proper corrective action.

A general misconception is that the safest time to fly is during daylight hours when unlimited visibility exists. However, in truth, the ability of pilots to "see and be seen", is the most difficult under such conditions. In the early days of aviation, aircraft were easier to be seen because they were metallic and highly reflective. The reflectivity made the aircraft easy to be visually observed. Today, however, aircraft are multicolored, striped, or marked and are in effect camouflaged. Some aircraft today, are painted in solid dark or light colors, compounding visual identification. For instance, a dark colored plane, when observed from above is almost impossible to see and blends in with the ground. Planes which are painted light colors are likewise difficult to locate when being observed against a sky background. The avoidance problem does not cease once the aircraft is sighted since just as often, a plane once sighted, is often visually lost because of the camouflage effect, either with the clouds, ground, or other background. To solve this problem, strobes have been placed on wing tips and at other locations of the aircraft. However, strobes and lights are ineffective in bright sunlight and are only viable alternatives during night flying or low visibility conditions.

The airlines and the Federal Aviation Agency is constantly trying to solve this problem. Some of the above described warning devices help with the age old problem of "see and be seen", but have not proven successful. Most of the prior art implementations are of the mechanical nature and only provide warnings of aircraft in the area. There are no known devices presently existing, which can be affixed to an aircraft which make it capable of being observed by another pilot in the vicinity.

The present invention provides a device which is both reflective and refractive and will greatly increase the visibility of any plane on which it is disposed. It will provide a reflective shimmering surface, which can be easily observed. It especially is effective on bright, sunny days where unlimited visibility exists.

SUMMARY OF THE INVENTION

A "see and be seen" device for use on aircraft comprising a reflective surface, having; a plurality of circular, concave indentions disposed therein; and a plurality of pyramid shaped refractive elements disposed adjacent to the concave indentions, whereby light is refracted by the refractive elements toward said concave indentions so as to be intensified and reflected, permitting the aircraft to be visually identified and located by pilots of other aircraft in the vicinity.

It is an object of the present invention to provide a device for affixing to aircraft which will reflect light and enable the aircraft to be seen by other aircraft in the vicinity.

It is still another object of the present invention to provide a reflective device which will refract light and intensify its reflection so as to be readily identified and located by other pilots of aircraft in the vicinity.

It is still another object of the present invention to provide a device for affixing to aircraft, which will reflect light so as to create a shimmering reflection so that the aircraft can be identified and located by other pilots of aircraft in the vicinity.

It is still another object of the present invention to provide a low cost device for affixing to an aircraft, which will reflect light, which is adapted to be mounted on any aircraft efficiently and economically.

It is still another object of the present invention to provide a device which will reflect light and make an aircraft visually identifiable, yet, not increase wind drag or resistance.

BRIEF DESCRIPTION OF THE DRAWING

FIG. 1, illustrates a top view of the reflective surface and the unique array of circular concave indentations in refractive pyramid elements;

FIG. 2, is a cross-sectional view of section 2—2 of FIG. 1;

FIG. 3, is a cross-sectional view of a wing tip, illustrating the device of the present invention applied to the curved surface of the wing;

FIG. 4, is a blown-up view of FIG. 3, illustrating the refracting, reflecting combination of the device of the present invention;

FIG. 5, is a perspective view of a typical aircraft illustrating various placements of the reflective device of the present invention.

DETAILED DESCRIPTION OF THE PREFERRED EMBODIMENT

The present invention is a "see and be seen" device for use on aircraft. This device is extremely effective in making an aircraft visable and identifiable and is not known in the prior art. The most critical cause of mid-air collision of aircraft is the inability of aircraft pilots to observe, identify, and locate aircraft, in the vicinity. The problem is particularly critical in modern aviation because of the large, slow reacting, yet, high speed commercial aircraft being flown. Radar and other technological developments, presently employed, warning pilots of aircraft in their vicinity have helped to some degree solve this problem. However, the warning devices do not prevent mid-air collisions. The pilots, after visual contact, can take proper corrective action. For such action to be taken, pilots must "see and be seen."

The present invention is a device which can be easily applied to all commercial aircraft. The device is economical and will greatly enhance identification and location of all aircraft in a vicinity through visual observation. The physical components of the present invention will first be described in detail, after which its use and interaction of the physical components, will be described.

Referring first, to FIGS. 1 and 2, the preferred form of the present invention is illustrated. In FIG. 1, a plan view is shown, while in FIG. 2, a cross-sectional view is illustrated. The reflective device 20, is formed in the preferred form of a thin mirror coated plastic tape material 23. The front surface 24, of the mirror coated plastic, has formed therein, an array of circular, concave elements 21. The mirror coated plastic tape member 23, may be formed by various techniques previously known in the art. For instance, however, the concave elements 21, can be formed by impression or by being premolded into the plastic tape material 23, either of which is acceptable as are other alternate methods. In the preferred form, the circular, concave elements are 1 inch in diameter distance 'A' in FIG. 2, and are spaced one from the other a distance of distance 'D', in FIG. 2. In the preferred form, the basic array is four elements 21 wide, by five elements 21 deep. Thus, an ordinary strip of the material would be about 6 inches wide and as long as needed, since the array would be repeated so as to be manufactured in the form of a tape. The depth 'B' of the indentation, is best determined from optical considerations. The purpose of the circular, concave elements 21, is to provide a reflective surface which intensifies and directs lightwaves to a much greater extent than a flat surface. The back side 25, of the tape material 23, contains an epoxy material, for securing the reflective device 20 to the aircraft.

In the preferred form of the present invention, twelve pyramid refraction elements 22, are used with each array of circular concave reflective elements 21. The refracting elements 22, are disposed within the space between four adjacent circular elements 21, FIG. 1. The refracting pyramids 22, in the preferred form, are made of a clear plastic and have a base 'E', which is ⅜ inches, and a height indicated as 'C', of ⅜ inches. The pyramid elements 22, may be formed as a unitary part of the tape 23, or may be joined to the tape 23, by epoxy or other securing material. The refracting elements 22, function as light strikes one surface and is redirected towards the reflecting circular concave elements 21. This redirecting is illustrated in FIGS. 3, and 4. The unusual effects of this redirection is discussed following the physical description.

As indicated in FIG. 1, twelve refracting pyramids 22, are disposed within each unique array 20. Each pyramid element 22, within the array in the preferred embodiment, is rotated so as to be in a different relationship with each other pyramid 22, within that array. Particularly, the pyramids 22 are rotated, so that their axis is 3.75° or a multiple thereof, from the axis of each other pyramid. This permits collection of light originating from any angle within a 360° arc to pass through, at least, one pryamid 22, and redirected towards a reflective surface 21. Often, however, many more than one reflective surface and pryamid will be involved in any one array. In the preferred form, each pryamid 22, is rotated 3.75° beginning at top left and proceeding to the bottom right, such that one particular point on a pyramid rotates through a 90° arc.

Having now described in some detail, the physical characteristics of the preferred form of the present invention, a typical use and application will be described. Referring first to FIG. 3, the reflective device 20, is shown disposed on the front portion 37 of the wing 30, of a typical aircraft. An additional strip is shown disposed on the rear edge 36, of the wing 30. Referring now to FIG. 4, an enlarged view of FIG. 3, light 40, is directed towards pyramid element 22. As light 40, passes through element 22', it is redirected so as to contact element 21'. At that point, the lens effect created by the concave formation of element 21' intensifies and directs light 40'. If the reflective device 20 were not used, no reflection would be created and visual observation of the aircraft would be significantly reduced. However, while light 40' is redirected by element 21, each slight movement of the aircraft will slightly change the direction of light 40'. An observer will notice the phenomenon as a shimmer. This shimmering effect cause aircraft to be readily identified. It is the constantly changing reflection which draws attention to the aircraft.

Referring to FIG. 5, a typical aircraft 50 is shown, having disposed thereon strips of the reflective device 20. The strips are disposed at critical locations about the aircraft to provide optimum visual identification possibilities. In the preferred form, strips are disposed on wing tips 38, top and bottom of fusalage, nose 31, and on portions of the tail assembly 39. The optimum location may vary from aircraft to aircraft, but observation must be available from top, bottom, front and back. Disposition of the reflective devices 20, on wing edges, permits through refraction, and reflection, a reflective pattern even when two aircraft are approaching front to front or back to front, without use of the present invention and in such conditions, no reflection would occur.

The present invention is formed of a light weight material so as not to increase the weight of the aircraft. The concave indentations 20, create a simple effect and reduce wind drag. The pyramid elements 22, do, however, increase wind drag a small amount. The net effect is that the drag is neither increased or decreased.

In an alternate embodiment, strobes and lights are disposed so as to be reflected in a shimmering pattern to increase visability both in day and night.

The present invention is also very useful for locating downed aircraft. Many times, the approximate location of downed aircraft is known, but air search is unable to locate by visual observation. The use of the present invention would enable a downed aircraft to be easily spotted from the air. Rapid location of downed aircraft is important because any survivor may require immediate medical care. The present invention serves many uses as have been described, in addition to other uses and purposes, all of which are obvious to those skilled in the art.

While the present invention has been described herein, it will be understood by those skilled in the art, that various changes in forms and details may be made therein, without departing from the spirit and scope of the invention.

I claim:

1. a "see and be seen" device for use on aircraft capable of receiving light from at least a one direction and for redirecting it in multiple directions, comprising:
   (a) a reflective means;
   (b) a refracting means disposed adjacent to said reflective means for directing light toward said reflective means;
   whereby the reflected light causes said aircraft to be visually identified and located by any other aircraft pilots in the vicinity.

2. The "see and be seen" device of claim 1, wherein said reflective means is comprised of a plurality of circular concave elements for serving as a lens means, for intensifying light and for redirecting said intensified light outward in many directions.

3. The "see and be seen" device of claim 1, wherein said refracting means comprises an array of pyramid shaped refracting elements disposed so as to be capable of receiving and refracting light through an entire 360° horizontal plane and at least a 180° vertical plane and redirecting said light towards said at least one of said circular, concave lens means.

4. A "see and be seen" device capable of being disposed on various portions of an aircraft, capable of receiving light from at least a one direction and for redirecting it in many directions, comprising:
   (a) a reflecting means, having formed therein, an array of concave circular indentations for serving as a lens means for intensifying and directing said intensified light, outward in many directions;
   (b) a refracting means comprising an array of pyramid shaped elements disposed adjacent to and between said concave circular indentations for receiving light from at least one direction and for refracting and redirecting light toward said concave circular indentations;
   whereby, the reflected light causes said aircraft to be visually identified and located by any other aircraft pilots in the vicinity.

5. The "see and be seen" device of claim 4, wherein said concave circular elements are 1" in diameter and equally spaced one from the other in a uniform repeating pattern of four wide and five down.

6. The "see and be seen" device of claim 4, wherein said pyramid shaped refracting means are disposed in said uniform pattern so as to be adjacent to four of said circular indentations.

7. The "see and be seen" device of claim 4, wherein the base and height of each of said pyramid shaped refracting means is ⅜ of an inch.

8. The "see and be seen" device of claim 4, wherein said pyramid shaped refracting means is formed of a clear plastic.

9. The "see and be seen" device of claim 4 wherein each of said pyramid shaped refracting means is rotated about its principle axis so as to have a different principle axis angular relationship than any other refracting means, said angular displacement being a multiple of 3.75 degrees.

10. The "see and be seen" device of claim 4, wherein said device is formed from mirror coated plastic.

11. The "see and be seen" device of claim 4, wherein said "see and be seen" device can be affixed to strategic portions of said aircraft, such as; leading edge of wing, fuselage top, fuselage bottom, tail and other areas for optimum visual observation, without affecting the flying characteristics of the aircraft.

* * * * *